(12) United States Patent
Gupta et al.

(10) Patent No.: US 8,700,557 B2
(45) Date of Patent: Apr. 15, 2014

(54) METHOD AND SYSTEM FOR ASSOCIATION AND DECISION FUSION OF MULTIMODAL INPUTS

(75) Inventors: Rohit Kumar Gupta, Kolkata (IN); Sandeep Gattani, Kolkata (IN); Aniruddha Sinha, Kolkata (IN); Ayan Chaki, Kolkata (IN); Arpan Pal, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 278 days.

(21) Appl. No.: 13/219,345

(22) Filed: Aug. 26, 2011

(65) Prior Publication Data
US 2012/0290526 A1 Nov. 15, 2012

(30) Foreign Application Priority Data
May 11, 2011 (IN) .......................... 1451/MUM/2011

(51) Int. Cl.
*G06N 5/02* (2006.01)

(52) U.S. Cl.
USPC .......................................................... 706/52

(58) Field of Classification Search
None
See application file for complete search history.

(56) References Cited

U.S. PATENT DOCUMENTS

| 6,502,082 | B1 * | 12/2002 | Toyama et al. | 706/16 |
|---|---|---|---|---|
| 2005/0238207 | A1 * | 10/2005 | Tavares | 382/115 |
| 2007/0160262 | A1 * | 7/2007 | Kim et al. | 382/100 |
| 2007/0203904 | A1 * | 8/2007 | Ren et al. | 707/5 |
| 2008/0240514 | A1 * | 10/2008 | Zhang et al. | 382/115 |
| 2009/0037978 | A1 * | 2/2009 | Luque et al. | 726/2 |
| 2009/0171623 | A1 * | 7/2009 | Kiefer | 702/181 |
| 2010/0030722 | A1 * | 2/2010 | Goodson et al. | 706/54 |
| 2010/0046806 | A1 * | 2/2010 | Baughman et al. | 382/115 |
| 2010/0228692 | A1 * | 9/2010 | Guralnik et al. | 706/12 |
| 2011/0211735 | A1 * | 9/2011 | Langley | 382/115 |
| 2011/0228094 | A1 * | 9/2011 | Cheng et al. | 348/159 |
| 2011/0271120 | A1 * | 11/2011 | Kevenaar et al. | 713/189 |
| 2012/0158739 | A1 * | 6/2012 | Ah-Pine et al. | 707/748 |
| 2012/0194662 | A1 * | 8/2012 | Zhang et al. | 348/77 |

OTHER PUBLICATIONS

Maltoni D. et al., "Biometric Fusion", Handbook of Fingerprint Recognition, pp. 303-339, 2009.*
Holzapfel H. et al., "Implementation and Evaluation of a ConstraintBased Multimodal Fusion System for Speech and 3D Pointing Gestures", ICMI'04, Oct. 13-15, 2004, State College, Pennsylvania, USA, pp. 175-182.*
Jain A. et al., "An Introduction to Biometric Recognition", IEEE Transactions on Circuits and Systems for Video Technology, vol. 14, No. 1, Jan. 2004, pp. 4-20.*

(Continued)

*Primary Examiner* — Jeffrey A Gaffin
*Assistant Examiner* — Dave Misir
(74) *Attorney, Agent, or Firm* — Akerman LLP; Peter A. Chiabotti; Roy P. Zachariah (57) ABSTRACT

A computer-based system and method to improve the multimodal fusion output at the decision level is disclosed. The method proposes computation of a confidence weighted measure for the individual score values obtained for each modality and fuse these new updated scores to get the final decision. These confidence weights are the performance parameters (measured in terms of F-measure) during the offline training step. The process significantly increases the accuracy of the multimodal system.

15 Claims, 3 Drawing Sheets

(56) References Cited

OTHER PUBLICATIONS

Rabuzin K. et al., "A Multimodal Biometric System Implemented within an Active Database Management System", Journal of Software, vol. 2, No. 4, Oct. 2007, pp. 24-31.*

He M. et al., "Performance evaluation of score level fusion in multimodal biometric systems", Pattern Recognition, 43, 2010, pp. 1789-1800.*

Subbarayudu V. et al., "Multimodal Biometric System", First International Conference on Emerging Trends in Engineering and Technology, IEEE, 2008, pp. 635-640.*

Atrey P. et al., "Multimodal fusion for multimedia analysis: a survey", Multimedia Systems, 2010, 16, pp. 345-379.*

Jain A. et al., "Multibiometric Systems", Communications of the ACM, Jan. 2004, vol. 47, No. 1, pp. 34-40.*

* cited by examiner

METHOD AND SYSTEM FOR ASSOCIATION AND DECISION FUSION OF MULTIMODAL INPUTS

CROSS-REFERENCE TO RELATED APPLICATIONS AND PRIORITY

The present application claims priority to Indian Patent Application No. 1451/MUM/2011, filed on May 11, 2011, the entirety of which is hereby incorporated by reference.

FIELD

The present application generally relates to the field of multiple-modality based recognition systems. More particularly, the application relates to a method and system for association and fusion of multimodal inputs using enhanced multimodal fusion decision module architecture.

BACKGROUND

Analysis of biological information is used for authentication of a person. This analysis largely known as "biometrics" includes sensing, measurement, and quantification of the biological information of person. Accordingly, biometrics includes sensing and measurement of physical or anatomical characteristics which are typically unique to person and certain dynamic quantities, which may be physiological, have variable quantitative nature. Examples of biometrics include fingerprints, retinal scans, speaker recognition, signature recognition, hand recognition and others.

Recognition of multiple biological characteristics information has primordial significance in the various areas e.g., authentication, robotics, personal entertainment and gaming.

Authentication is a process of verifying that the user is who they claim to be. A goal of biometric verification is to determine if the user is the authentic enrolled user or an impostor. Generally, biometric verification includes capturing human input, filter out unwanted input such as noise, statistical analysis of the biometric input and matching against biometric information previously gathered and stored during an enrollment procedure.

The use of one of these physical characteristics for recognizing an individual is termed as unimodal verification system. On the contrary, if multiple physical characteristics are combined to decide the identity, it is called a multi-modal verification system.

A multimodal biometric system allows the integration of two or more types of biometric recognition and verification systems in order to meet stringent performance requirements. An example of a multimodal system may include a combination of fingerprint verification, face recognition, and voice verification. Multimodal biometric systems may be used to take advantage of the proficiency of each individual biometric and help overcome some of the limitations of a single biometric.

Multi-modal refers to multiple sources of data from which identification can be made. The sources of data can be different features of an entity to be identified such as retinal scan ("iris"), fingerprint, voice, facial features, handwriting, vein analysis, or the like. These multimodal systems are used today worldwide in various applications such as car-infotainment systems, robotics applications and gaming applications. For example, mobile devices are recently being designed to take speech and gesture movements as inputs for exploring various applications on the mobile device. Further, there are variety of interactive games that uses multimodal data as inputs for taking various decisions while playing these games. One of the well-know interactive game Kinect™ uses the depth information as an input.

In a conventional multi-modal verification system, the multiple modalities of a person to be verified are obtained and fusion of these multimodal inputs received is done by the system. The fusion of multimodal inputs is done at three levels namely sensor, feature and decision or score level. The multimodal inputs are analyzed at different instance and for each instance of multimodal input, a score is generated for each of the inputs. The decision to accept or reject an individual is made based on the maximum probable value for each of the said inputs.

Thus, the conventional multi-modal system at certain instances may lack accuracy in the identification of an individual due to ignorance of modality input that has less probable values. Hence, there is a need for improved multi-modal verification system that provides more accuracy in recognizing the individual to be verified.

Efforts have been made in the past for improving the multi-modal verification system using biometrics as modalities.

However, existing approaches to address the problem of enhancing the accuracy of recognition is limited to biometric modality inputs. That is they are not capable of handling the non-biometric inputs such as hand gestures. The performance of existing solutions in the art may degrade in real unconstrained environments such as varying lightning conditions, non-uniform distance between the camera and the entity/person/individual/subject to be verified, variable image resolution, blur factors etc. Further, the known systems and methods lack determination of association of one instance of a modality input with the instance of another modality input.

Thus, in the light of the above, it is evident that, there is a need for system and method that provides a novel decision module architecture that improves the overall accuracy of the subject authentication by:
  Establishing association between at least one instances of modality input with the instance of other modality input.
  Enhancing the performance of the multi-modal verification system even in unconstrained environmental conditions.
  Enabling recognition with modality inputs as non-biometric data.

OBJECTIVES

The principal objective is to provide a method and system that enables an improved multi-modal fusion decision module that provides an efficient decision-making mechanism in relation to accuracy of multimodal data inputs.

Yet another objective is to enable generate and extract scores of each of the multiple modality inputs.

Yet another objective is to enable computation of performance parameters such as F-measure (CA), F-measure (CR) and scoring accuracy (SA) by analyzing the scores of each of the multiple modal inputs to obtain confidence weighted measure values.

Yet another objective is enable establishment of association between at least one instance of modality input with instance of at least other modality input.

Yet another objective is to enable modification of scores by weighing the scores of each of the modal inputs with the confidence weighted measure value.

Yet another objective is to enable combination of modified scores of each of the multiple modal inputs to generate an overall score.

Still another objective is to take future decision related to accuracy of the multimodality data inputs based on the generated overall score.

SUMMARY

Before the present methods, systems, and hardware enablement are described, it is to be understood that this application is not limited to the particular systems, and methodologies described, as there can be multiple possible embodiments of the present application which are not expressly illustrated in the present disclosure. It is also to be understood that the terminology used in the description is for the purpose of describing the particular versions or embodiments only, and is not intended to limit the scope of the present application.

The present application provides a method and system for recognition of multimodal inputs associated with a subject for comprehensive multimodal decision fusion output. In a preferred embodiment of the application, the application proposes computation of performance parameters such as F-measure (CA), F-measure (CR) and scoring accuracy based on analysis of individual raw scores of each modality input received from the subject under verification.

The computed performance parameters are considered as confidence weighted measures and are used to weight each raw score to obtain an updated score for each of the modality inputs at different instances. The updated scores are then subjected to multimodal fusion wherein these scores are combined to generate an overall score. Finally the decision on whether to accept or reject the subject is taken based on the overall score by the decision module.

The application enables associating one instance of modality input with instance of other modality input based on the F-measure (CR) value computed of the computed performance parameters.

BRIEF DESCRIPTION OF DRAWINGS

The foregoing summary, as well as the following detailed description of preferred embodiments, is better understood when read in conjunction with the appended drawings. There is shown in the drawings example embodiments; however, the application is not limited to the specific system and method disclosed in the drawings.

DETAILED DESCRIPTION

The description has been presented with reference to an exemplary embodiment of the application. Persons skilled in the art and technology to which this application pertains will appreciate that alterations and changes in the described method and system of operation can be practiced without meaningfully departing from the principle, spirit and scope of this application.

The fusion of multimodal inputs can be done at three levels namely sensor-level, feature-level or decision-level. The present application proposes a method and system to improve the fusion of multimodal inputs at the decision-level in order to verify the identity of the subject in a more accurate manner.

Figure 1:
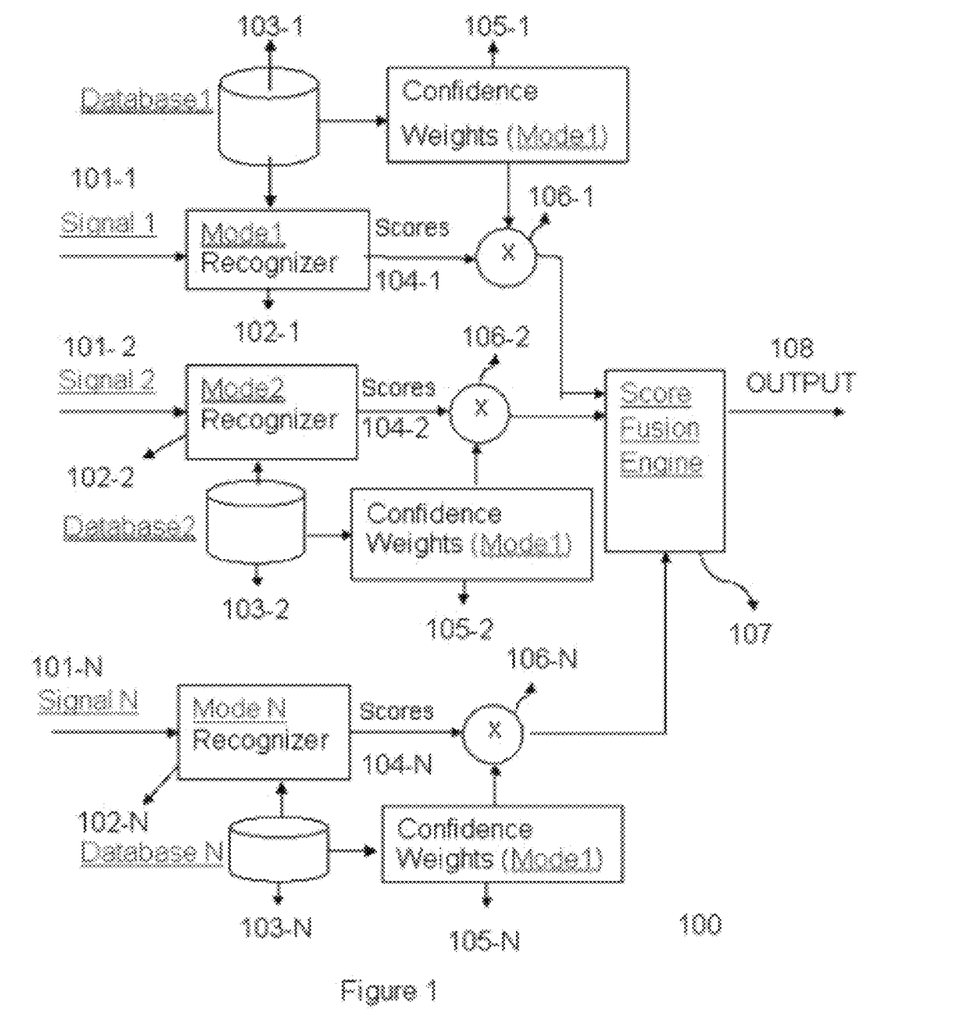
FIG. 1 schematically shows an improved multimodal fusion decision module architecture 100 containing different system elements that collectively performs the task of fusion of multimodal inputs and establishing association among individual inputs.

Referring to FIG. 1 is system architecture 100 of the decision module implementing the procedural steps for accurate identification of a subject. As shown in the figure, multiple modalities in the form of input signals 101-1, 101-2 . . . 101-N are received from the subject whose identity needs to be verified. Each of the said multimodal inputs is received by multiple recognizer modules 102-1, 102-2 . . . 102-N capable of recognizing the identity of the subject.

Each recognizer module 102-1, 102-2 . . . 102-N is further connected to databases 103-1, 103-2 . . . 103-N respectively that has a function of recording the data related to multimodal inputs during training and testing phases of the decision module proposed in an embodiment of the present application. Each of these databases is divided into two sets that namely training set and testing set. The training set includes input signals 101-1, 101-2 . . . 101-N recorded during training phase and the testing phase includes actual data recorded while testing phase of the decision module.

In an embodiment of the present application, consider N audio commands are associated with N gestures. The audio and gesture commands represents multimodal input signals 101-1, 101-2 . . . 101-N taken at different instances. In another embodiment of the application, these inputs may include other modalities such as lip movements, iris, fingerprints etc.

For each instance of audio command, the audio recognition algorithm implemented by each of the recognizer module receiving the audio commands at each instance generates N scores indicating the probability of the commands. Similarly, for an instance of a gesture, the gesture recognition algorithm implemented by each of the recognizer module receiving the gesture commands at each instance generates N scores indicating the probability of the gestures.

In normal scenario, the command or the gesture with maximum probable value is considered as a candidate one. However, combining the scores to get a final decision is proposed in the present application. It can be understood by a person skilled in the art that this application is not limited combining to audio and gesture commands, but can be used in any multimodal scenario.

The method proposed in the present application includes two phases namely:
 a) Training Phase and
 b) Testing Phase.

In the training phase, the audio and gesture recognition is done and score values are extracted for different instances (recorded in real environmental conditions for robust results). As shown in FIG. 1, for various audio and gesture input signal 101-1, 101-2 . . . 101-N received by the recognizer modules 102-1, 102-2 . . . 102-N are recognized and score values 104-1, 104-2 . . . 104-N are extracted for these signals for different instances.

In an embodiment of the present application, these scores obtained during training phase are used to establish association between instances of audio command with instance of gesture command. This association is established by calculating performance parameters such as (F-measure (CA), F-measure (CR) and Scoring Accuracy). These performance parameters are calculated using CA (correct accept), CR (correct reject), FA (false accept) and FR (false reject) values. The CA, CR, FA and FR values are obtained from the scores 104-1, 104-2 . . . 104-N extracted for each of the multimodal inputs.

The calculation of performance parameters is described below.

Performance Parameters:

"Precision" and "Recall" are the two most commonly used performance measuring parameters. Precision is the probability that a (randomly selected) classification is correct whereas Recall is the probability that a (randomly selected) classification is correctly identified. To meet optimal performance, one should not only consider instances that were correctly classified but also look into the depth of erroneous classifications. For this reason both the amount of correctly rejected, CR and correctly accepted, CA (and hence the amount of falsely rejected, FR and falsely accepted, FA) realizations are important in the performance calculation. The precision and recall for CA and CR are given in the equations below.

$$Precision_{CA} = \frac{CA}{CA + FA} \quad (1)$$

$$Recall_{CA} = \frac{CA}{CA + FR} \quad (2)$$

$$Precision_{CR} = \frac{CR}{CR + FR} \quad (3)$$

$$Recall_{CR} = \frac{CR}{CR + FA} \quad (4)$$

In an embodiment of the application, the Scoring accuracy and the F-measure have been used as the performance parameters which are described in the remaining part of the specification:

Scoring Accuracy:

Precision and recall are two widely used metrics for evaluating the correctness of a pattern recognition algorithm. They can be seen as extended versions of accuracy, a simple metric that computes the fraction of instances for which the correct result is returned. A measure that combines all these four parameters (CA, CR, FA, and FR) is the scoring accuracy. It is defined as follows:

$$SA = \frac{CA + CR}{CA + CR + FA + FR} \quad (5)$$

By using equation 5 above, the scoring accuracy can be calculated.

F-Measure:

Another measure that combines precision and recall is the harmonic mean of precision and recall, the traditional F-measure or balanced F-score. We can determine F-Measure from the following two perspectives, CA and CR.

$$F-Measure_{CA} = \frac{2 \times Precision_{CA} \times Recall_{CA}}{Precision_{CA} + Recall_{CA}} \quad (6)$$

$$F-Measure_{CR} = \frac{2 \times Precision_{CR} \times Recall_{CR}}{Precision_{CR} + Recall_{CR}} \quad (7)$$

Equations 6 and 7 can be used for calculating the F-measure performance parameters namely F-measure correct accept (CA) and F-measure correct reject (CR) respectively.

All these performance parameters i.e. computed SA (Scoring Accuracy), F-measure correct accept (CA) and F-measure correct reject (CR) can be used as confidence weights in the multimodal decision architecture. As shown in the FIG. 1, the confidence weights 105-1, 105-2 . . . 105-N are obtained for each of the multiple instance for which input audio and gesture signals are recorded.

In an embodiment of the application, the confidence weights 105-1, 105-2 . . . 105-N generated in terms of F-measure values obtained during training phase are used for establishing the association of the audio and gesture commands which is further explained as below:

The association of the individual instances of both the modalities (audio and gesture commands) is determined by the confidence weights obtained during the training phase, such that one instance supports the other modality input instance in case of a failure or wrong detection.

F-measure correct reject (CR) values are arranged in ascending and descending order for audio and gesture instances respectively as shown in Table 1.

Speech commands with higher F-measure correct reject (CR) values are associated with gesture instances of lower F-measure correct reject (CR) values and vice-versa. Hence, the strong performing instance is clubbed with the weak performing instance of another module. The audio and gesture commands shown in Table 1 have been shown for illustrative purpose only. However, the proposed methodology will work for any type of modality commands.

As shown in the Table 1, the association between the multiple speech command with corresponding F-measure CR values in descending order and the gesture commands with corresponding F-measure CR values in ascending order is being established. Thus, the present application enables association of multiple instances of multiple modality inputs.

The confidence weight obtained in the training phase are further used for fusion of multimodal inputs in order to enhance the performance of the decision module to identify the subject being authenticated using the said decision module.

As discussed earlier, the confidence weights represent F-measure values of the individual multi-modal inputs. F-measure of CR (correct reject) gives better performance to the overall fusion system. This principal has been used for fusion of multiple inputs in an embodiment of the present application.

TABLE 1

Association of different Instances of each modality based on F-measure Values

| | Audio Commands | Association | Gesture Commands | |
|---|---|---|---|---|
| F-measure-CR (Audio) (Descending order) | Louder | ⇔ | 2 finger horizontal | F-measure-CR (Gesture) (Ascending order) |
| | Softer | ⇔ | 3 finger horizontal | |
| | Mute | ⇔ | 4 finger horizontal | |
| | Menu | ⇔ | 1 finger horizontal | |
| | Play | ⇔ | 1 finger vertical | |

The scores 104-1, 104-2 . . . 104-N extracted as shown in FIG. 1 are normalized and then fed into decision blocks 106-1, 106-2 . . . 106-N respectively. These scores are first weighted with the confidence weights 105-1, 105-2 . . . 105-N respectively in terms of corresponding F-measure values to obtain modified or updated scores for each of the multiple instances for audio and gesture inputs obtained during training phase. This phenomenon of weighing the scores with confidence measure associated with each of the multiple instances using the corresponding F-measure value is termed as "Late Fusion Technique".

These update scores are then fed finally to score fusion engine 107 as shown in FIG. 1 to obtain the final decision by the decision module whether to accept or reject the subject being authenticated. The final decision is based on the output 108 shown in FIG. 1 representing fusion score or overall score.

Let 'N' be the number of audio/gesture commands. Then the decision score (fused match score Si) vector is obtained as:

$$S_i = F(a_i) \times Sa_i + F(g_i) \times Sg_i \quad 1 \leq i \leq N \qquad (8)$$

In equation 8, 'F(ai)' and 'F(gi)' represent the respective harmonic means of Precision and Recall (F-measure values) for the ith instance of audio and gesture recognition engines. 'Sa' and 'Sg' are the score vectors assigned by the respective recognition engines for Audio and Gesture. We normalize them (using Min-Max Normalization Technique) as under and use them in above equation:

$$Sa_i = \frac{Sa_i - \min(Sa_i)}{\max(Sa_i) - \min(Sa_i)} \quad 1 \leq j \leq N \qquad (9)$$

$$Sg_i = \frac{\max(Sg_i) - Sg_i}{\max(Sg_i) - \min(Sg_i)} \quad 1 \leq j \leq N \qquad (10)$$

If both recognition engines yielded the same result, it was accepted as such. Since the probability of simultaneous error for the same instance in minimal. In case of a conflict, the decision module classifies the input fusion score 'Si' to the corresponding input instance. The reason for using late fusion when both recognition engines yielded same results is based on the fact that the probability of both engines yielding same incorrect result at the same time tends to be zero.

During the testing phase, the Audio is recorded via mic and Static Hand Gesture is inputted through a Logitech Camera, recognition module for both is run in parallel and corresponding scores are obtained. Then, the corresponding confidence weights representing F-measure for the audio and gesture commands recorded are obtained. The confidence measure value is used to update the scores by weighing the scores with the confidence weights. Finally, the fusion of the updated scores is done using the fusion score engine to obtain the final overall score. The decision on whether to accept or reject the subject whose audio and gesturer commands are recorded in the testing phase is then determined based on the final overall score.

Figure 2:
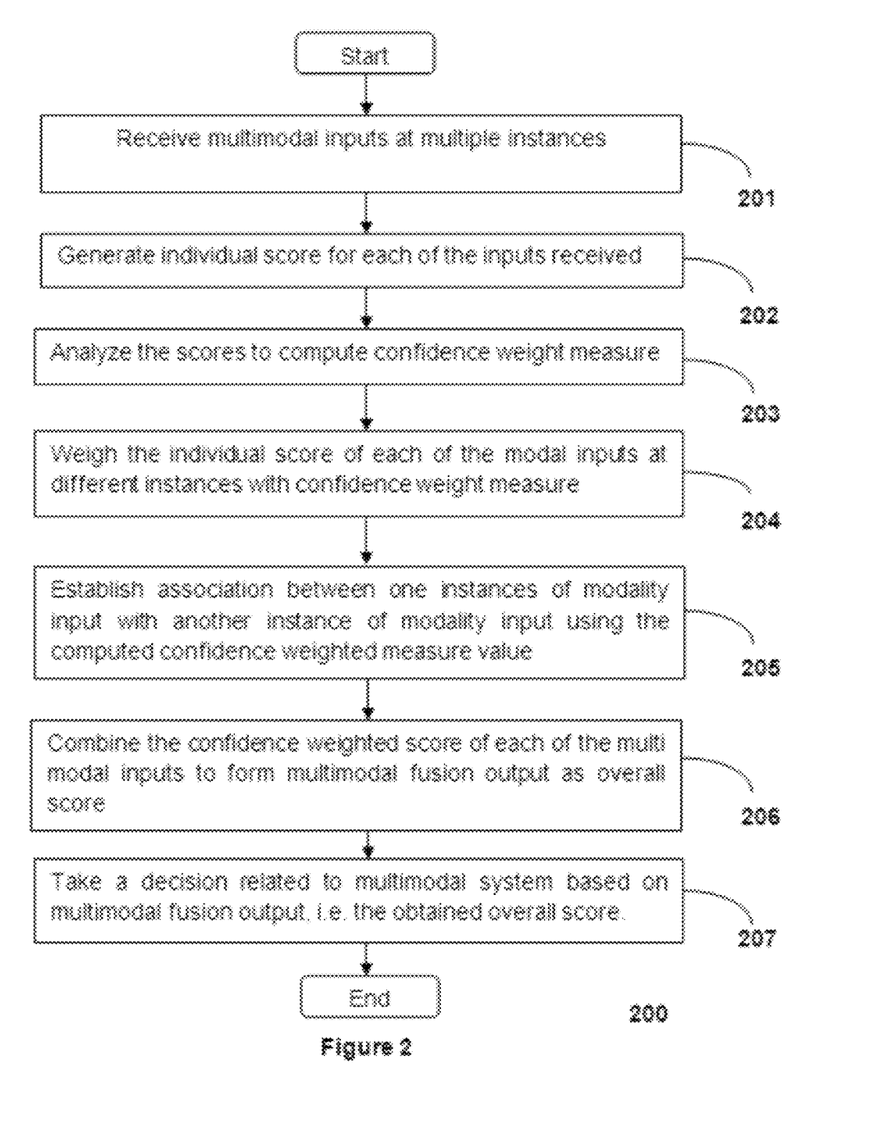
FIG. 2 is a flow chart 200 showing different procedural steps implemented for fusion and association of multimodal inputs using the multimodal fusion decision module.

Referring to FIG. 2 is a flow chart 200 depicting steps performed by the decision module for accurate decision making in relation to the multimodal system.

At step 201, multiple modality inputs from the subject captured at different instances are received.

At step 202, individual raw score for each of the multiple inputs is being generated.

At step 203, computation of confidence measure is done based on the individual scores for each of the multiple inputs.

At step 204, the individual raw score for each of the multiple inputs is being weighted with the confidence measure to obtain modified scores.

At step 205, the association between at least one instances of modality input is established with at least another instance of modality input using confidence measure value.

At step 206, the multimodal fusion of the modified scores is done to obtain an overall score.

At step 207, the verification of the identity of the subject is being decided based on the overall score or the fusion output.

Figure 3:
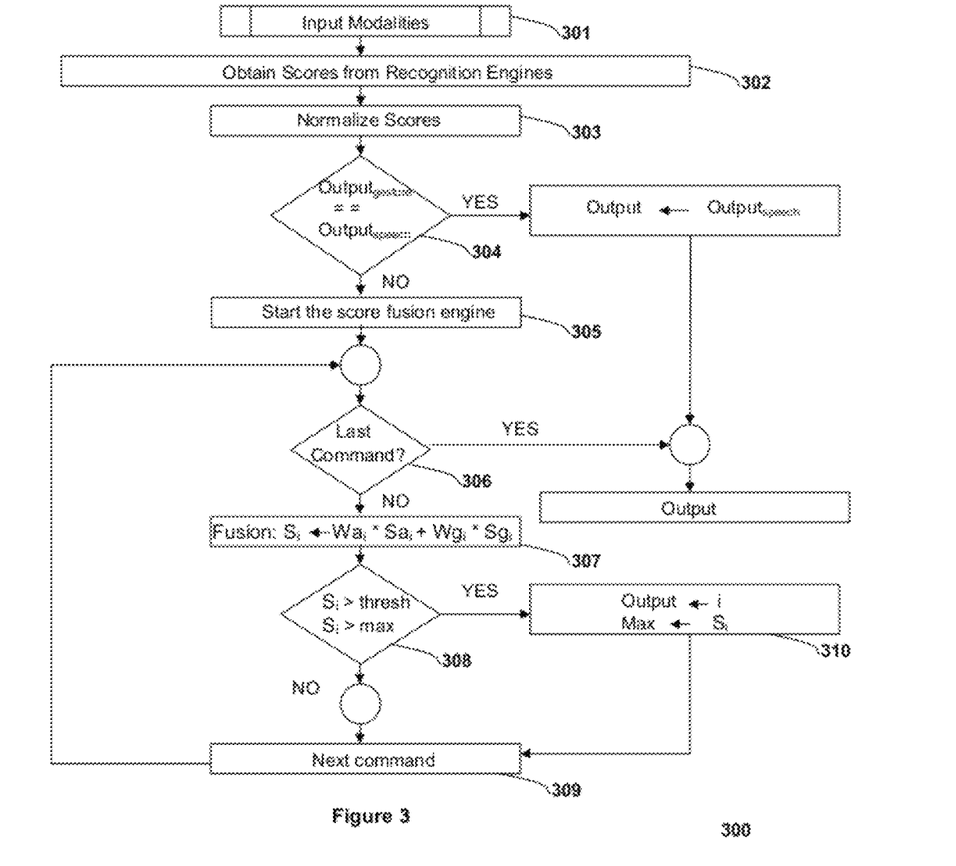
FIG. 3 is a flow chart 300 showing an alternate example of fusion of multimodal commands using the multimodal fusion decision module.

Referring to FIG. 3 is a flow chart 300 showing an alternate example of fusion of multimodal commands using the multimodal fusion decision module.

At step 301, input modalities in the form of audio and gesture commands are accepted.

At step 302, an individual score for each of the input modalities (audio and gesture) is obtained from the recognition engine/module.

At step 303, normalization of score is done using confidence weighted measure.

At step 304, association between audio and gesture commands is checked. If the association exists, the speech command is outputted, else the process moves to step 305.

At step 305, the fusion of confidence weighted score for audio and gesture commands is initiated.

At step 306, it is verified whether the latest speech command is the last one. If the command is the last, then the corresponding speech is outputted. Else, the process moves to step 307.

At step 307, the fusion of multiple audio and gesture commands is done.

At step 308, it is checked whether the fusion of multiple audio and gesture commands exceeds threshold value. If yes, the process moves to step 310. If no, the process moves to step 309.

At step 309, the step 306, 307 and 308 are repeated for the next commands received.

At step 310, the speech command at the instance at which the fusion value exceeds the threshold value is outputted.

ADVANTAGES

The present application has following advantages:
It is possible to verify the identity of the subject irrespective of whether the multimodal inputs received from the subject are biometric or non-biometric.
The performance of the verification system is enhanced even in real unconstrained environmental conditions.
The proposed method enables to associate one instance of a modal input with other instance of another modal input.
Usage of F-measure parameters as confidence measure enables improvement of overall performance of the decision module architecture to verify the identity of the subject.
The multimodal fusion decision module proposed in the present application has wide usage in various applications such as car-infotainment systems, enhanced security systems, virtual gaming and many more.

The methodology and techniques described with respect to the exemplary embodiments can be performed using a machine or other computing device within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The machine may include a processor (e.g., a central processing unit (CPU), a graphics processing unit (GPU, or both), a main memory and a static memory, which communicate with each other via a bus. The machine may further include a video display unit (e.g., a liquid crystal display (LCD), a flat panel, a solid state display, or a cathode ray tube (CRT)). The machine may include an input device (e.g., a keyboard) or touch-sensitive screen, a cursor control device (e.g., a mouse), a disk drive unit, a signal generation device (e.g., a speaker or remote control) and a network interface device.

The disk drive unit may include a machine-readable medium on which is stored one or more sets of instructions (e.g., software) embodying any one or more of the methodologies or functions described herein, including those methods illustrated above. The instructions may also reside, completely or at least partially, within the main memory, the static memory, and/or within the processor during execution thereof by the machine. The main memory and the processor also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions, or that which receives and executes instructions from a propagated signal so that a device connected to a network environment can send or receive voice, video or data, and to communicate over the network using the instructions. The instructions may further be transmitted or received over a network via the network interface device.

While the machine-readable medium can be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: tangible media; solid-state memories such as a memory card or other package that houses one or more read-only (non-volatile) memories, random access memories, or other re-writable (volatile) memories; magneto-optical or optical medium such as a disk or tape; non-transitory mediums or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

The description has been presented with reference to an exemplary embodiment of the application. Persons skilled in the art and technology to which this application pertains will appreciate that alterations and changes in the described method and apparatus of operation can be practiced without meaningfully departing from the principle, spirit and scope of this application.

We claim:

1. A method for detecting a command capable of controlling a device, the method comprising:
    receiving a first input signal having a first instance of a plurality of first instances, wherein the first instance is descriptive of the first input signal;
    receiving a second input signal having a second instance of a plurality of second instances, wherein the second instance is descriptive of the second input signal, and wherein the first instance and the second instance when performed simultaneously constitute the command;
    generating a first set of scores for the first input signal by correlating the first instance with each instance of the plurality of first instances of the first input signal;
    generating a second set of scores for the second input signal by correlating the second instance with each instance of the plurality of second instances of the second input signal;
    modifying the first set of scores based on a first set of confidence weights in order to generate a third set of scores;
    modifying the second set of scores based on a second set of confidence weights in order to generate a fourth set of scores;
    combining, via a processor, the third set of scores and fourth set of scores using an association rule to generate a final score; and
    detecting the command to control the device based on the final score.

2. The method of claim 1, wherein the first set of scores and the second set of scores are calculated using performance parameters, wherein each of the performance parameters comprises one of F-measure correct accept, F-measure correct reject, scoring accuracy or a combination thereof.

3. The method as claimed in claim 2, wherein the F-measure correct accept, F-measure correct reject, and scoring accuracy are calculated using correct accept, correct reject, false accept, and false reject values.

4. The method of claim 3, further comprising associating each of the plurality of first instances with each of the plurality of second instances prior to generating the first set of scores and the second set of scores.

5. The method of claim 4, wherein the plurality of first instances has corresponding F-measure correct reject values in ascending order, and wherein the plurality of second instances has corresponding F-measure correct reject values in descending order.

6. The method of claim 1, wherein each of the first input signal and the second input signal comprises one of biometric, non-biometric inputs or a combination thereof.

7. The method of claim 1, wherein the first input signal is an audio signal and the second input signal is a gesture signal.

8. The method of claim 7, wherein the plurality of first instances associated with the audio signal comprises louder, softer, mute, menu, or play, and wherein the plurality of second instances associated with the gesture signal comprises 2 finger horizontal, 3 finger horizontal, 4 finger horizontal, 1 finger horizontal, or 1 finger vertical.

9. A system for detecting a command capable of controlling a device, the system comprising:
a memory that stores instructions;
a processor that executes the instructions to perform operations, the operations comprising:
receiving a first input signal having a first instance of a plurality of first instances, wherein the first instance is descriptive of the first input signal;
receiving a second input signal having a second instance of a plurality of second instances, wherein the second instance is descriptive of the second input signal, and wherein the first instance and the second instance when performed simultaneously constitute the command;
generating a first set of scores for the first input signal by correlating the first instance with each instance of the plurality of first instances of the first input signal;
generating a second set of scores for the second input signal by correlating the second instance with each instance of the plurality of second instances of the second input signal;
modifying the first set of scores based on a first set of confidence weights in order to generate a third set of scores;
modifying the second set of scores based on a second set of confidence weights in order to generate a fourth set of scores;
combining the third set of scores and fourth set of scores using an association rule to generate a final score;
detecting the command to control the device based on the final score.

10. The system as claimed in claim 9, wherein the first set of scores and the second set of scores are calculated using performance parameters, each of the performance parameters comprises one of F-measure correct accept, F-measure correct reject, scoring accuracy or a combination thereof.

11. The method as claimed in claim 10, wherein the F-measure correct accept, F-measure correct reject, and scoring accuracy are calculated using correct accept, correct reject, false accept, and false reject values.

12. The system as claimed in claim 11, further comprising associating each of the plurality of first instances with each of the plurality of second instances.

13. The method as claimed in claim 12, wherein the plurality of first instances has corresponding F-measure correct reject values in ascending order, and wherein the plurality of second instances has corresponding F-measure correct reject values in descending order.

14. The system as claimed in claim 9, wherein each of the first input signal and the second input signal comprises one of biometric, non-biometric inputs or a combination thereof.

15. The method as claimed in claim in claim 9, wherein each of the first input signal and the second input signal comprises a gesture signal or an audio signal.

* * * * *